United States Patent
Xiang et al.

(12) 
(10) Patent No.: US 11,023,493 B2
(45) Date of Patent: Jun. 1, 2021

(54) INTELLIGENTLY SCHEDULING RESYNCHRONIZATION JOBS IN A DISTRIBUTED OBJECT-BASED STORAGE SYSTEM

(71) Applicant: VMware, Inc., Palo Alto, CA (US)

(72) Inventors: Enning Xiang, San Jose, CA (US); Yiqi Xu, Redwood City, CA (US); Eric Knauft, San Francisco, CA (US); Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 242 days.

(21) Appl. No.: 16/182,448

(22) Filed: Nov. 6, 2018

(65) Prior Publication Data

US 2020/0142995 A1    May 7, 2020

(51) Int. Cl.
| | |
|---|---|
| G06F 9/46 | (2006.01) |
| G06F 16/27 | (2019.01) |
| H04L 29/08 | (2006.01) |
| G06F 9/54 | (2006.01) |

(52) U.S. Cl.
CPC ............ *G06F 16/273* (2019.01); *G06F 9/546* (2013.01); *H04L 67/1095* (2013.01); *H04L 67/1097* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 9,483,359 | B2 * | 11/2016 | Montulli | G06F 11/1451 |
| 9,547,559 | B2 * | 1/2017 | Whitehead | G06F 11/14 |
| 10,547,679 | B1 * | 1/2020 | Burnett | H04L 67/1095 |
| 2016/0085633 | A1 * | 3/2016 | Factor | G06F 3/067 |
| | | | | 707/685 |
| 2017/0063986 | A1 * | 3/2017 | Gopal | H04L 67/1095 |
| 2018/0260125 | A1 * | 9/2018 | Botes | G06F 3/067 |
| 2019/0050255 | A1 * | 2/2019 | Chagam Reddy | G06F 9/4881 |
| 2020/0026786 | A1 * | 1/2020 | Cadarette | G06F 16/2379 |
| 2020/0042349 | A1 * | 2/2020 | Jain | G06F 9/4881 |

\* cited by examiner

*Primary Examiner* — Kenneth Tang

(57) ABSTRACT

Techniques for intelligently scheduling resynchronization jobs in a distributed object-based storage system are provided. In one set of embodiments, a storage node of the system can create a resynchronization job for a component of an object maintained by the system, where the resynchronization job defines one or more input/output (I/O) operations to be carried out with respect to the component. If a number of currently running resynchronization jobs on the storage node has reached a threshold, the storage node can further determine a priority level associated with the object; add the resynchronization job to an object queue for the object; and if the added resynchronization job is a first job in the object queue, add the object queue as a new queue entry to a global priority queue corresponding to the priority level associated with the object.

21 Claims, 7 Drawing Sheets

INTELLIGENTLY SCHEDULING RESYNCHRONIZATION JOBS IN A DISTRIBUTED OBJECT-BASED STORAGE SYSTEM

BACKGROUND

In a distributed object-based storage system, files are mapped to data containers referred to as objects and each object is composed of one or more components that are stored across the distributed storage nodes of the system. For example, consider a virtual disk (VM) file that is associated with a storage policy indicating that access to the file should be tolerant of a single node failure. In this case, the VM file may be mapped to an object comprising two (or potentially more) components C1 and C2 that each contain the entirety of the data for the file (in other words, C1 and C2 are replicas of each other). These two components can be placed on distinct storage nodes N1 and N2 respectively, thereby ensuring that if one node becomes unavailable the file data will still be accessible via the replica component stored on the other node.

In certain scenarios, the various components of an object maintained by a distributed object-based storage system can become "out of sync" with respect to each other, or the physical storage utilization at the storage nodes can become unbalanced. In these scenarios, the storage system will generally update or move component data across nodes via a process known as data resynchronization. For instance, in the example above with components C1 and C2, assume node N1 goes offline for some period of time (which means component C1 becomes inaccessible) and in the interim, writes are made to component C2. Further assume that node N1 comes back online after the writes are completed to C2. In this case, when N1 is available again, a resynchronization engine will create a resynchronization job for component C1 in order to update C1 to include the writes made to C2 during the downtime of N1, as well as for other components on N1 that require updating. The resynchronization engine will then kick off these resynchronization jobs in an arbitrary order (e.g., round robin), subject to a maximum in-flight job limit, and thereby resynchronize the components stored on N1.

One issue with the general resynchronization workflow above is that, because resynchronization jobs are defined on a per-component basis and are executed in an arbitrary fashion, the average time needed to complete data resynchronization for all of the components of a given object will be close to the amount of time needed to complete all pending resynchronization jobs (assuming a similar resynchronization workload across objects). This has a number of adverse consequences. For example, if the object is associated with a fault tolerance requirement, the time window during which the object is not in-compliance with this requirement (which may correspond to the time window needed to complete resynchronization of all of the object's components) may be fairly long, which is undesirable. Further, in cases where the object is being moved to another storage node for storage rebalancing purposes, there is a certain amount of slack space created on the source storage node as data is copied out; however, this slack space cannot be recycled until all of the object's component resynchronization jobs have completed successfully, which means that the slack space will be tied up for a significant amount of time.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for intelligently scheduling resynchronization jobs in a distributed object-based storage system. At a high level, these techniques involve (1) grouping together resynchronization jobs on an per-object basis such that all of the jobs of a given object are dispatched and completed within a relatively small time window, and (2) scheduling the resynchronization jobs of higher priority objects before the resynchronization jobs of lower priority objects. Taken together, these techniques advantageously avoid or minimize the adverse consequences arising out of executing resynchronization jobs in an arbitrary order.

The foregoing and other aspects of the present disclosure are described in further detail below.

2. System Architecture

Figure 1:
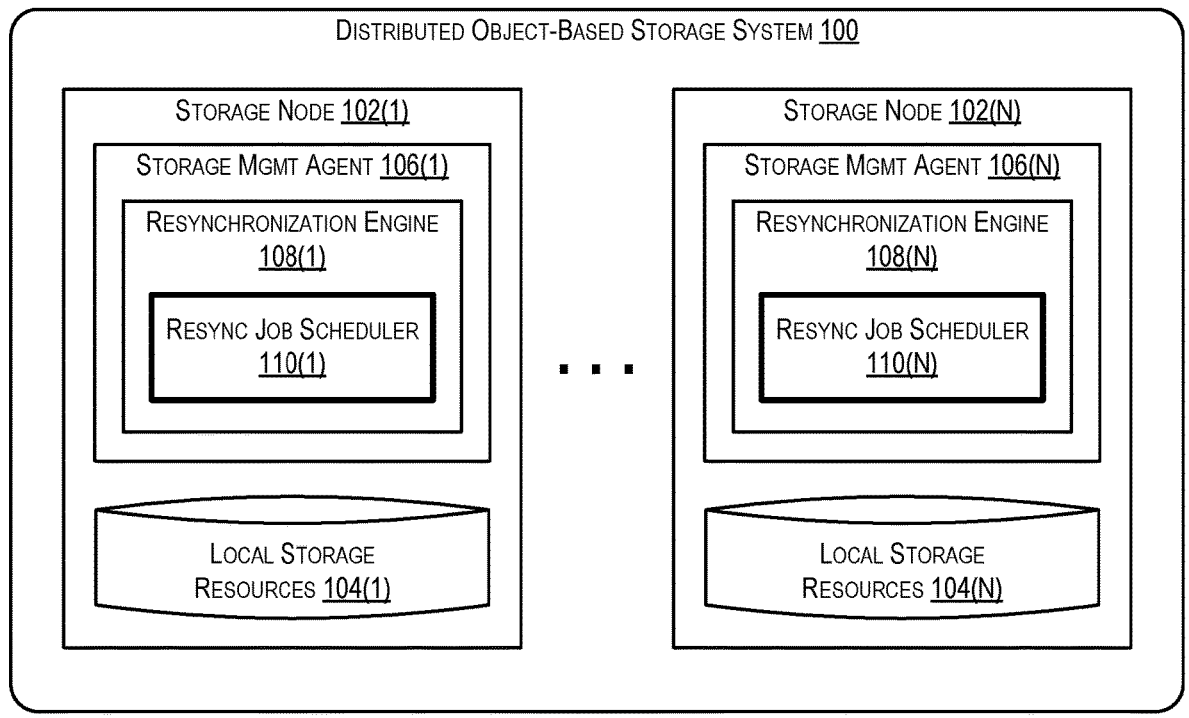
FIG. 1 depicts a distributed object-based storage system that implements intelligent resynchronization job scheduling according to an embodiment.

FIG. 1 depicts a distributed object-based storage system 100 that implements intelligent resynchronization job scheduling according to an embodiment. As shown, storage system 100 comprises a plurality of storage nodes 102(1)-(N) that each include a set of local storage resources 104 (encompassing, e.g., one or more solid-state disks (SSDs), magnetic hard disks, non-volatile memory, etc.) and a storage management agent 106. In one set of embodiments, each storage node 102 may be a general-purpose computer system that provides compute as well as storage services, such as hosts in a virtual storage area network (vSAN) cluster. In other embodiments, each storage node 102 may be a dedicated storage appliance or server.

Figure 2:
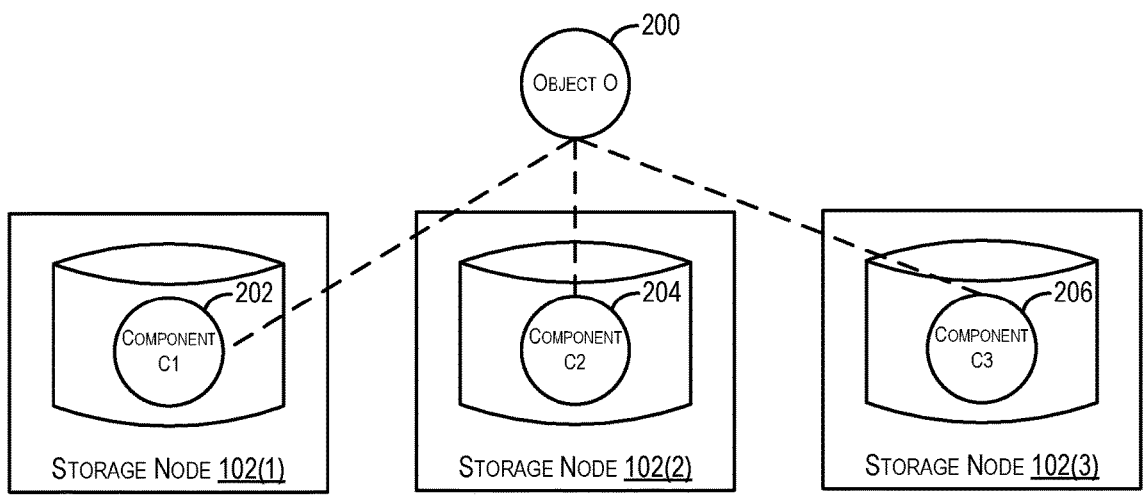
FIG. 2 depicts an example object and constituent components as stored on the distributed object-based storage system of FIG. 1.

Generally speaking, storage management agents 106(1)-(N) are configured to manage the storage of files across the local storage resources of nodes 102(1)-(N) in the form of data containers known as objects. Each object, in turn, is composed of one or more components, which can be understood as sub-objects that contain some portion of the data and/or metadata of its parent object. For instance, FIG. 2 depicts an example object O (reference numeral 200) which may correspond to, e.g., a VM file or any other type of file maintained by storage system 100. Object O is composed of three components C1 (reference numeral 202), C2 (reference numeral 204), and C3 (reference numeral 206) that are stored on storage nodes 102(1), 102(2), and 102(3) respectively. In one set of embodiments, components C1, C2, and C3 may be replica components that mirror the data of object O for fault tolerance/redundancy. In another set of embodiments, components C1, C2, and C3 may be stripe components that each contain a disjoint subset (i.e., stripe) of the data of object O to improve read/write throughput for the object. In yet other embodiments, components C1, C2, and C3 may represent any other type of data or metadata element of object O (e.g., a namespace component, witness component, etc.).

As mentioned previously, in certain scenarios the various components of an object that are stored on a distributed object-based storage system like system 100 of FIG. 1 can become out of sync, or the physical storage utilization on the storage nodes can become unbalanced. For example, if components C1-C3 of FIG. 2 are configured as replicas of each other, there might be a situation where component C1 fails to receive writes made to components C2 and/or C3 due to, e.g., a transient failure at node 102(1), resulting in a mismatch between the data contents of C1 and C2/C3. As another example, there might be a situation where node 102(2) reaches its storage capacity while the storage resources of nodes 102(1) and 102(3) remain underutilized. In these and other similar scenarios, storage system 100 can execute, via resynchronization engines 108(1)-(N), a data resynchronization process to update or move component data across the nodes of the system and thereby resynchronize the content of out-of-sync components (or rebalance storage load across nodes).

In conventional implementations, at the time storage management agent 106 of a given storage node 102 determines that data resynchronization is required, the corresponding resynchronization engine 108 creates a resynchronization job for each component assigned to agent 104 that needs to be updated/moved as part of the resynchronization process. This resynchronization job is a data structure that defines the input/output (I/O) operations to be carried out with respect to the component, such as copying data to the component from another component residing on another node, moving the component to another node, or the like. Once created, the resynchronization engine runs the resynchronization jobs in some arbitrary order (e.g., round robin), subject to a maximum in-flight job limit. Once all of the resynchronization jobs have finished successfully, the data resynchronization is deemed complete.

However, as noted in the Background section, a significant drawback of executing resynchronization jobs in a round-robin or other similar fashion is that, on average, the total amount of time needed to finish the resynchronization jobs for the components of a given object (and thus finish resynchronization of the object as a whole) will be comparable to the total amount of time needed to finish all resynchronization jobs across all objects. This is because a round-robin ordering will make steady progress on all pending resynchronization jobs, but will generally not complete the jobs for any single object until almost everything is done (assuming similar resynchronization workloads across objects).

The foregoing means that if an object is associated with a fault tolerance requirement (i.e., a requirement indicating that the object should remain accessible in the face of one or more failures), the object may not be in compliance with this requirement for a fairly lengthy period of time, since it is possible that there will only be one available copy of the object on the nodes of the system until the object's resynchronization is complete. The foregoing also means that if an object is being moved, the storage space consumed by the object's components on the source node (referred to as "slack space") cannot be freed and recycled for a while (i.e., until all of the object's components have been fully copied over to a destination node).

To address these issues, each resynchronization engine 108 of FIG. 1 is enhanced to include a novel resync job scheduler 110. Resync job scheduler 110 can be implemented in software, in hardware, or via a combination thereof. As described in further detail below, resync job scheduler 110 can enable its corresponding resynchronization engine 108 to implement intelligent job scheduling by queuing resynchronization jobs into a two-level queue structure. In various embodiments, the top level of the structure comprises a set of global priority queues, with each global priority queue corresponding to a priority level that has been defined for objects in the storage system. For example, if there are three object priorities "high," "regular," and "low," there will be a "high" global priority queue, a "regular" global priority queue, and a "low" global priority queue. The bottom level of the structure comprises a set of per-object queues (i.e., one queue for each object).

By using this two-level structure to queue and dispatch resynchronization jobs, resync job scheduler 110 can ensure that the resynchronization jobs for higher-priority objects are run before the resynchronization jobs of lower-priority objects. At the same time, scheduler 110 can increase the likelihood that the resynchronization jobs for a given object will be run temporally close to one another, rather than being spaced out and interleaved with the resynchronization jobs of other objects. This can advantageously reduce the amount of time for which an object is out of compliance with respect to fault tolerance during the resynchronization process, and can also allow slack space to be freed and recycled earlier. Workflows for implementing resync job scheduler 110 are described in the sections that follow.

It should be appreciated that storage system 100 of FIG. 1 is illustrative and not intended to limit embodiments of the present disclosure. For example, although FIG. 1 depicts a particular arrangement of entities in storage system 100, other arrangements or configurations are possible depending on the specific system. Further, the various entities shown may have subcomponents or functions that are not specifically described. One of ordinary skill in the art will recognize other variations, modifications, and alternatives.

3. Creating and Queueing a New Resynchronization Job

Figure 3:
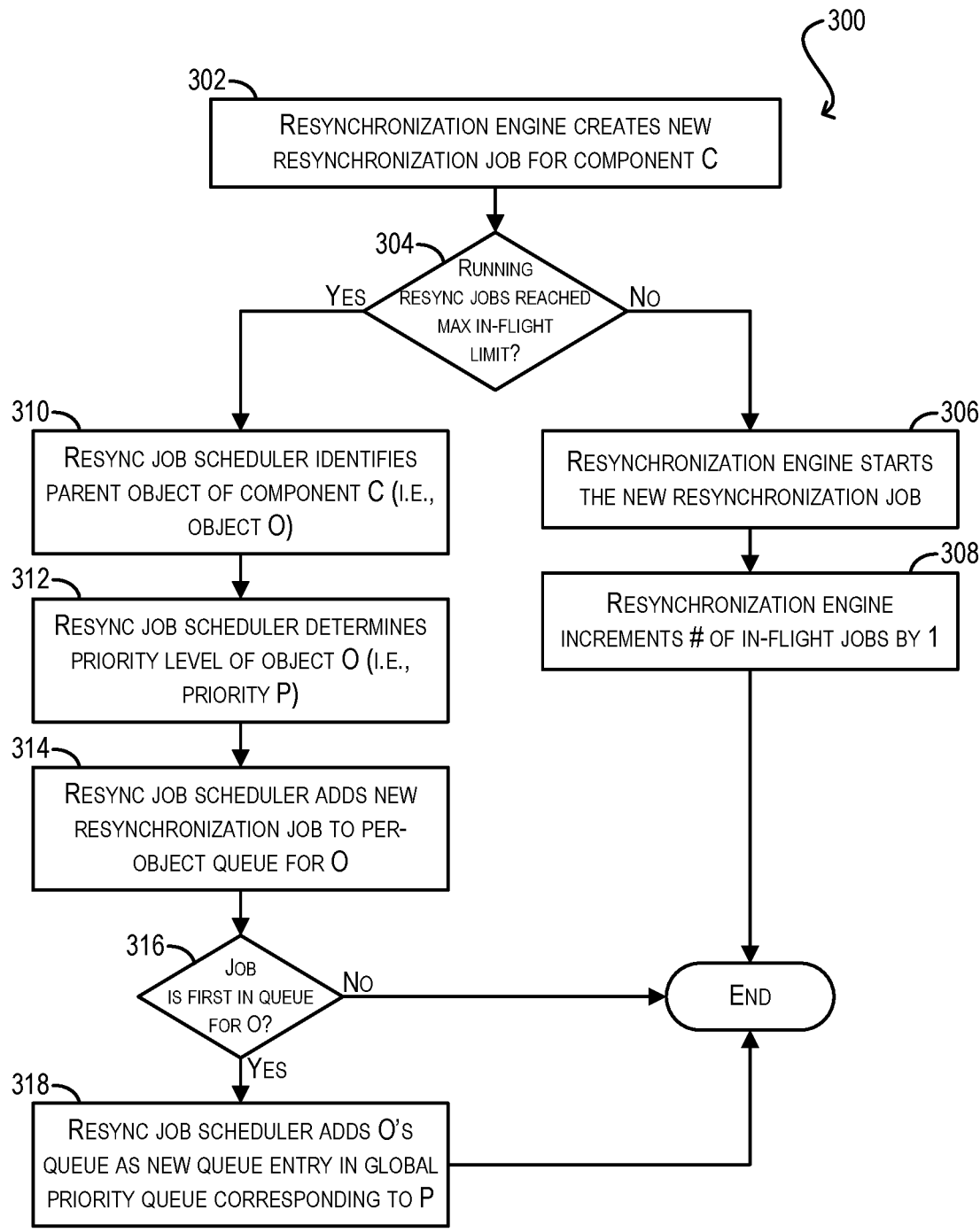
FIG. 3 depicts a workflow for creating and queueing a new resynchronization job according to an embodiment.

FIG. 3 depicts a workflow 300 that may be performed by resynchronization engine 108/resync job scheduler 110 of a given storage node 102 for creating and queuing a new resynchronization job according to an embodiment. Workflow 300 assumes that the node's storage management agent 106 has initiated data resynchronization with respect to the components/objects associated with (e.g., owned by) the agent.

Starting with block 302, resynchronization engine 108 can create a new resynchronization job pertaining to a component C. As mentioned previously, this resynchronization job can be a data structure that defines one or more I/O (e.g., data update or movement) operations to be carried out with respect to C in order to achieve some resynchronization goal, such as updating C to be consistent with a replica component on another node, moving C to an underutilized node, etc.

At block 304, resynchronization engine 108 can determine whether a current number of in-flight (i.e., running) resynchronization jobs on engine 108 has reached a threshold, referred to as the "max in-flight job limit." This max in-flight job limit is a predefined value that specifies the maximum number of resynchronization jobs that resynchronization engine 108 is allowed to run concurrently. If the answer at block 304 is no, that means the resynchronization job created at block 302 does not need to be queued (since resynchronization engine 108 has the ability to run it immediately). Accordingly, resynchronization engine 108 can start the new resynchronization job (i.e., begin executing the operations defined in the resynchronization job) (block 306), increment the current number of in-flight resynchronization jobs by 1 (block 308), and terminate the workflow.

On the other hand, if resynchronization engine 108 determines at block 304 that the max in-flight job limit has been reached, control can be passed to resync job scheduler 110, which can carry out a series of steps for queueing the new resynchronization job on the two-level queue structure described previously. In particular, resync job scheduler 110 can first identify the parent object of component C (e.g., object O) (block 310). Resync job scheduler 110 can further determine the priority level associated with object O (e.g., priority P) (block 312). In various embodiments, this priority level may be assigned to the object at the time the object's corresponding file is first created.

Resync job scheduler 110 can then add the new resynchronization job to an internal object queue (or "per-object queue") that is specific to object O (block 314) and can check whether the added job is the first job in the object queue for O (block 316). If the answer is no, workflow 300 can end.

However, if the added job is the first job in object O's queue, resync job scheduler 110 can add the queue for O (or some entity that can be used to retrieve the queue for O, such as a pointer to the queue) as a new queue entry in a global priority queue corresponding to priority P (block 318). In this way, resync job scheduler 110 can keep track of the fact that object O has one or more pending resynchronization jobs at priority P. At the conclusion of this step, workflow 300 can end. Upon workflow termination, the workflow can be repeated as needed by resynchronization engine 108/resync job scheduler 110 in order to process further resynchronization jobs created by engine 108.

Figure 4:
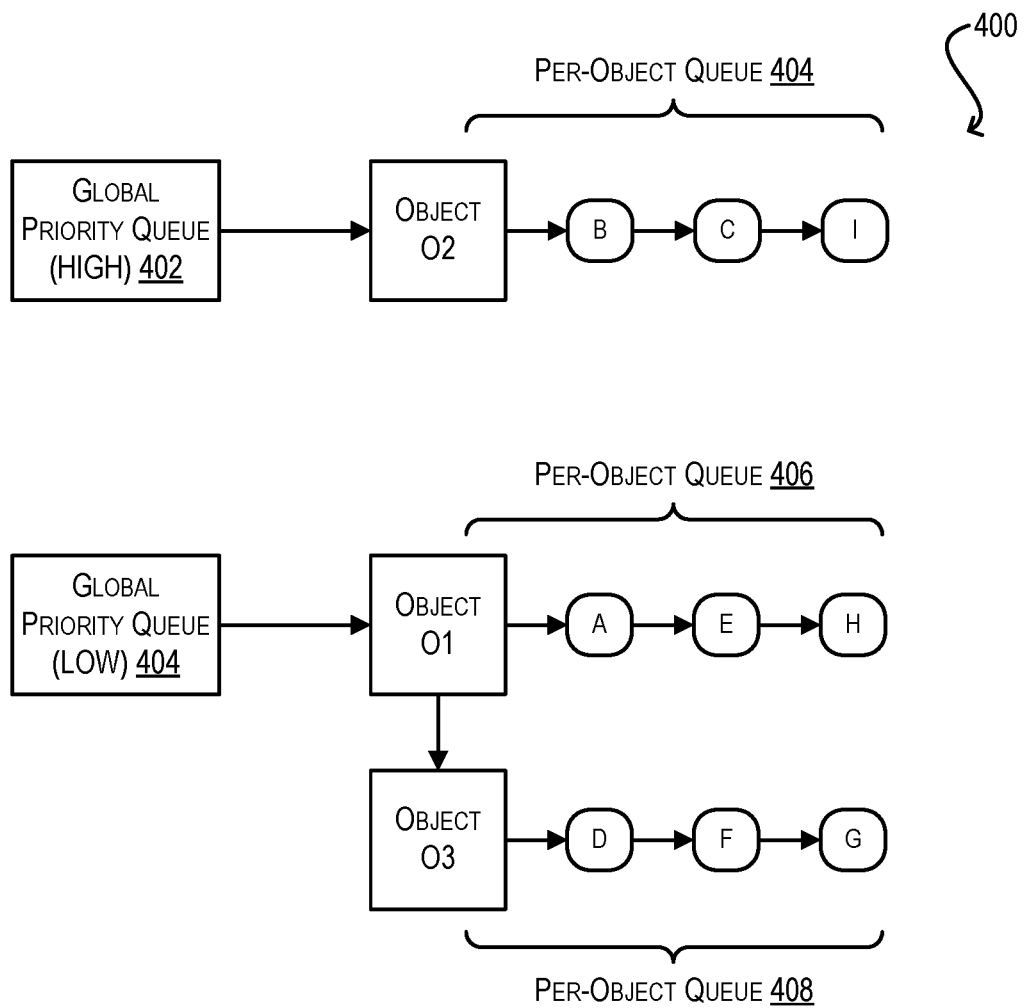
FIG. 4 depicts an example two-level queue structure according to an embodiment.

To further illustrate the processing of workflow 300, FIG. 4 depicts a diagram 400 of a two-level queue structure 400 that would be created by resync job scheduler 110 via workflow 300 after the creation and queuing of the following resynchronization jobs, in this order:
1. Job A of object O1 (object priority "Low")
2. Job B of object O2 (object priority "High")
3. Job C of object O2 (object priority "High")
4. Job D of object O3 (object priority "Low")
5. Job E of object O1 (object priority "Low")
6. Job F of object O3 (object priority "Low")
7. Job G of object O3 (object priority "Low")
8. Job H of object O1 (object priority "Low")
9. Job I of object O2 (object priority "High")

As shown in FIG. 4, the queuing of the forgoing resynchronization jobs results in two global priority queues, a high global priority queue 402 and a low global priority queue 404 (one for each object priority "High" and "Low"). Within high global priority queue 402, there is a single queue entry corresponding to object O2 which points to a per-object queue for O2 (reference numeral 404) comprising jobs B, C, and I, in that order.

Within low global priority queue 404, there is a first queue entry corresponding to object O1 which points to a per-object queue for O1 (reference numeral 406) comprising jobs A, E, and H, in that order. In addition, there is a second queue entry corresponding to object O3 which points to a per-object queue for O3 (reference numeral 408) comprising jobs D, F, and G, in that order.

4. Dispatching and Executing a Queued Resynchronization Job

Figure 5:
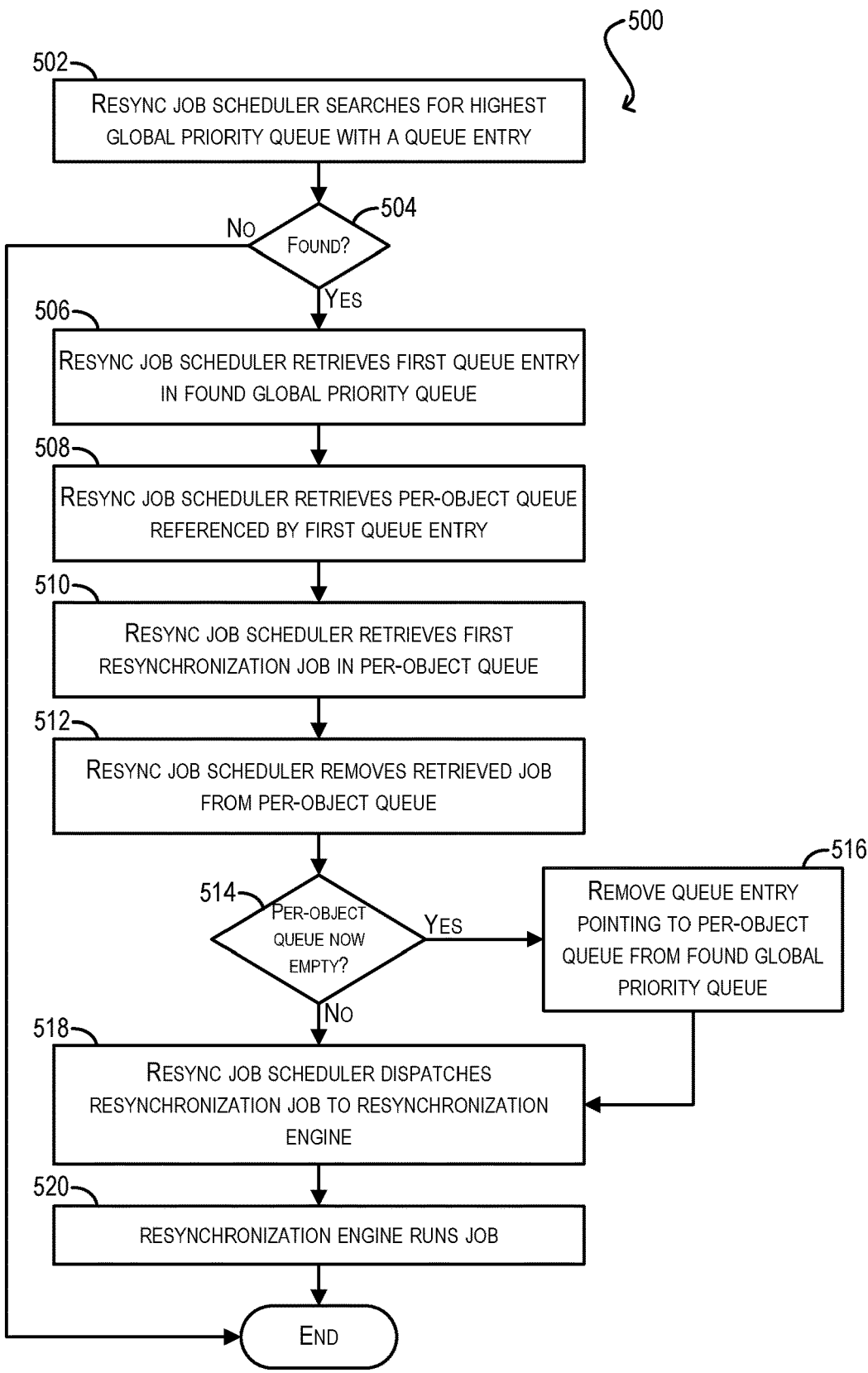
FIG. 5 depicts a workflow for dispatching and executing a queued resynchronization job according to an embodiment.

FIG. 5 depicts a workflow 500 that may be performed by resynchronization engine 108/resync job scheduler 110 of a given storage node 102 for dispatching and executing a queued resynchronization job according to an embodiment. Generally speaking, workflow 500 will be triggered when an open job slot is made available in resynchronization engine 108 (in other words, when the number of concurrently running resynchronization jobs in engine 108 falls below the max in-flight job limit).

Starting with block 502, resync job scheduler 110 can search for the highest global priority queue (i.e., the global priority queue corresponding to the highest object priority level) that has a queue entry pointing to a per-object queue. If no such global priority queue is found (which will occur of there are no pending resynchronization jobs) (block 504), resync job scheduler 110 can terminate the workflow.

Otherwise, resync job scheduler 110 can retrieve the first queue entry in the found global priority queue (block 506), retrieve the per-object queue referenced by the first queue entry (block 508), retrieve the first resynchronization job included in the per-object queue (block 510), and remove the retrieved resynchronization job from that per-object queue (block 512). Resync job scheduler 110 can also check whether the per-object queue is now empty (block 514) and if so, can remove the queue entry pointing to that per-object queue from the global priority queue found at blocks 502/504 (block 516).

Finally, resync job scheduler 110 can dispatch the resynchronization job retrieved at block 510 to resynchronization engine 108 (block 518), which can run the job (block 520) and end workflow 500. Upon workflow termination, the workflow can be repeated as needed by resynchronization engine 108/resync job scheduler 110 in order to dispatch and execute further queued resynchronization jobs as additional open job slots become available in engine 108.

To further clarify the processing of workflow 500, the following table lists the order in which resynchronization engine 108 will execute the queued resynchronization jobs shown in FIG. 4 per the steps of workflow 500. As can be seen, the resynchronization jobs of high priority object O2 are executed before the resynchronization jobs of low priority objects O1 and O3. This is because resync job scheduler 110 will always prioritize the queued resynchronization jobs in higher priority global queues over the queued jobs in lower priority global queues. Further, the jobs of O1 and O3 (which have the same priority level) are sequenced on a per-object basis (i.e., O1's jobs are grouped together and O3's jobs are grouped together). In this particular example, O1's jobs are executed before O3's jobs because the first job of O1 was created and queued before the first job of O3.

TABLE 1

| Execution Order | Resynchronization Job | Object |
|---|---|---|
| 1 | B | O2 |
| 2 | C | O2 |
| 3 | I | O2 |
| 4 | A | O1 |
| 5 | E | O1 |
| 6 | H | O1 |
| 7 | D | O3 |
| 8 | F | O3 |
| 9 | G | O3 |

5. Implementing Per-Job Priorities

In some embodiments, in additional to per-object priorities, resync job scheduler 110 can also take into account per-job priorities at the time of queuing and dispatching resynchronization jobs. This enables, e.g., one or more resynchronization jobs of a particular object O to have a priority that is higher that the priority of object O itself, which can be useful in certain situations. For example, assume object O has an object priority of "Regular," but an administrator decides to make a storage policy with respect to O (such as enabling fault tolerance) that needs to be implemented immediately. In this case, a resynchronization job can be created for one or more components of O that has a job priority of "High," and resync job scheduler 110 can queue this job such that it is dispatched and run before other pending resynchronization jobs of object O (or the pending resynchronization jobs of other objects) that have lower priorities.

Figure 6:
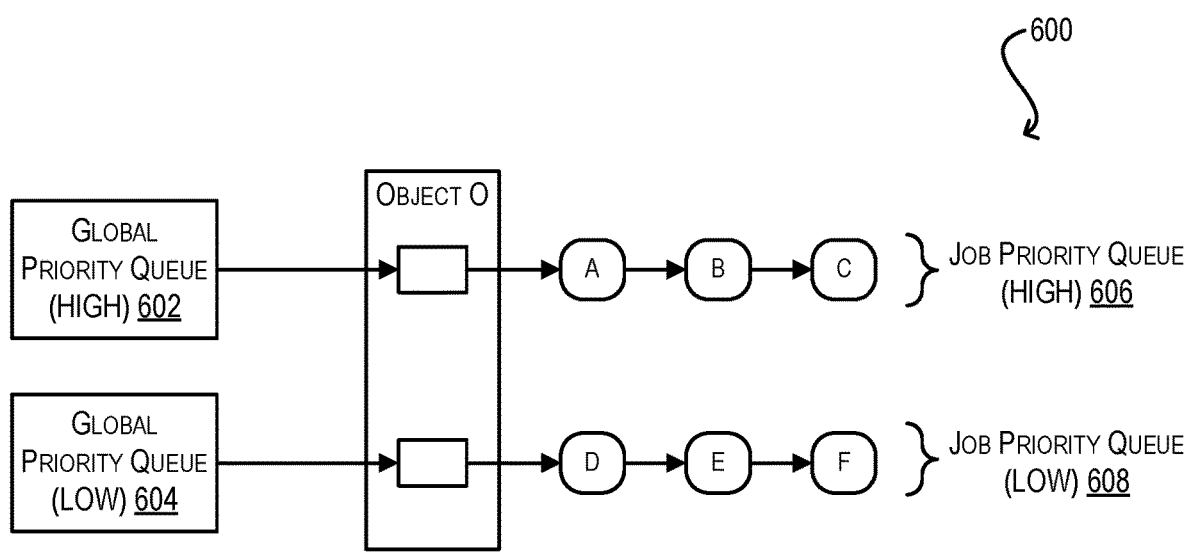
FIG. 6 depicts a modified two-level queue structure that supports per-job priorities according to an embodiment.

In order to implement per-job priorities, resync job scheduler 110 can utilize a two-level queue structure that is similar to structure 400 of FIG. 4, but rather than creating a single lower-level queue per object, scheduler 110 can create multiple per-object "job priority" queues (one for each priority level assigned to the resynchronization jobs of the object). In addition, resync job scheduler 110 can link the global priority queues to the appropriate per-object job priority queues. This modification is shown in FIG. 6, which depicts two global priority queues (a high global priority queue 602 and a low global priority queue 604) and two per-object job priority queues for an object O (a high job priority queue 606 and a low job priority queue 608). Note that high global priority queue 602 is linked to high job priority queue 606 while low global priority queue is linked to low job priority queue 608. Thus, in operation, resync job scheduler 110 will dispatch the resynchronization jobs of object O based on their per-job priorities (by virtue of the linkages between the global and job priority queues).

Figure 7:
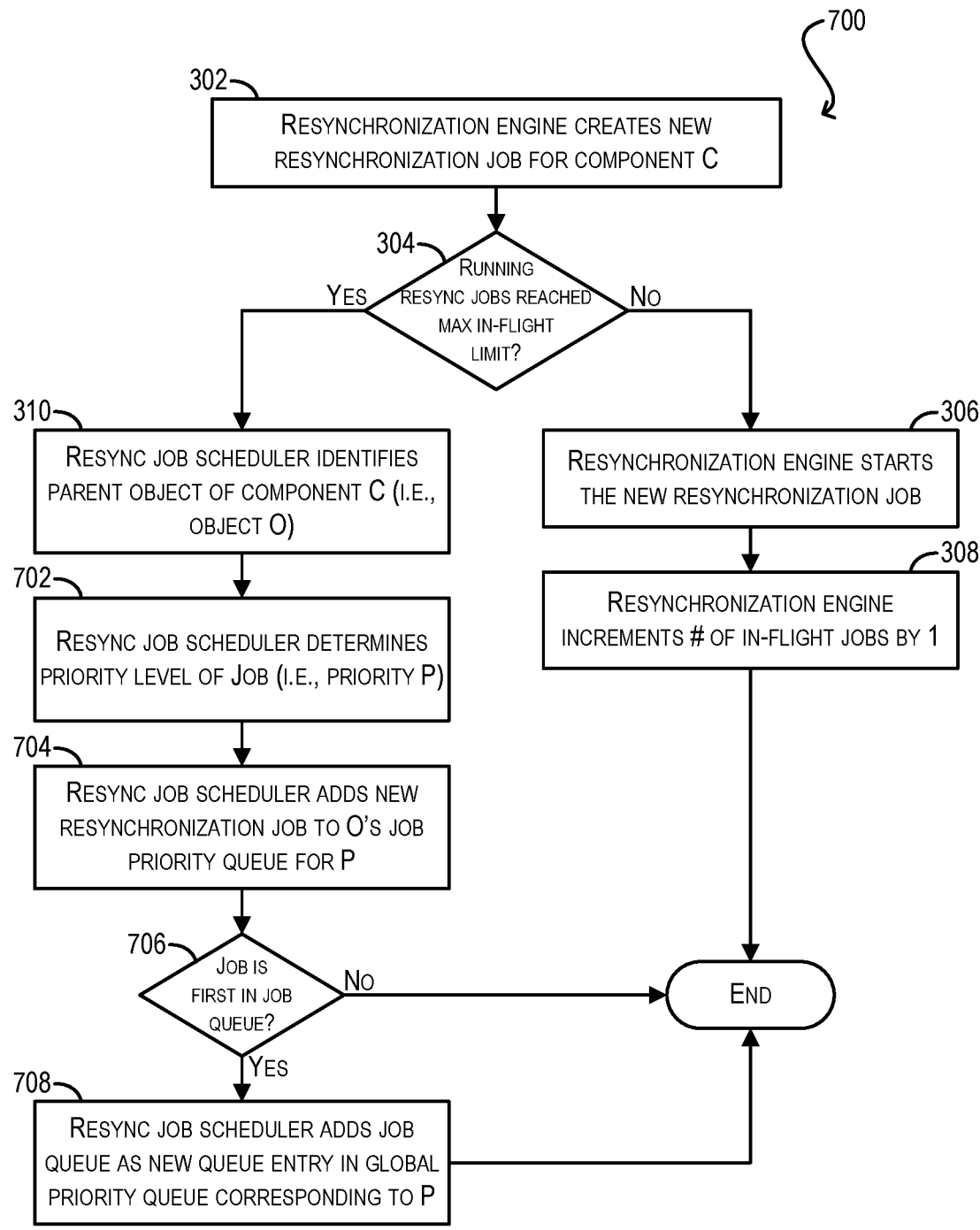
FIG. 7 depicts a modified version of the workflow of FIG. 3 that supports per-job priorities according to an embodiment.

FIG. 7 depicts a workflow 700 that can be performed by resynchronization engine 108/resync job scheduler 110 of a given storage node 102 for creating and queuing a new resynchronization job in a manner that supports per-job priorities according to an embodiment. A portion of workflow 700 is identical to workflow 300 of FIG. 3 and thus the overlapping steps are referred to using the same reference numerals. However, after block 310, resync job scheduler 110 can determine the priority level associated with the new resynchronization job (i.e., priority P) (block 702). As part of this block, in some embodiments resync job scheduler 110 can set the priority of the job to be equal to or higher that the priority level associated with parent object O (if the job priority is lower).

Then, at blocks 704 and 706, resync job scheduler 110 can add the new resynchronization job to object O's job priority queue corresponding to priority P and can check whether this added job is the first in the job priority queue. If so, resync job scheduler 110 can add the job priority queue as a new queue entry in the global priority queue corresponding to priority P (block 708).

Figure 8:
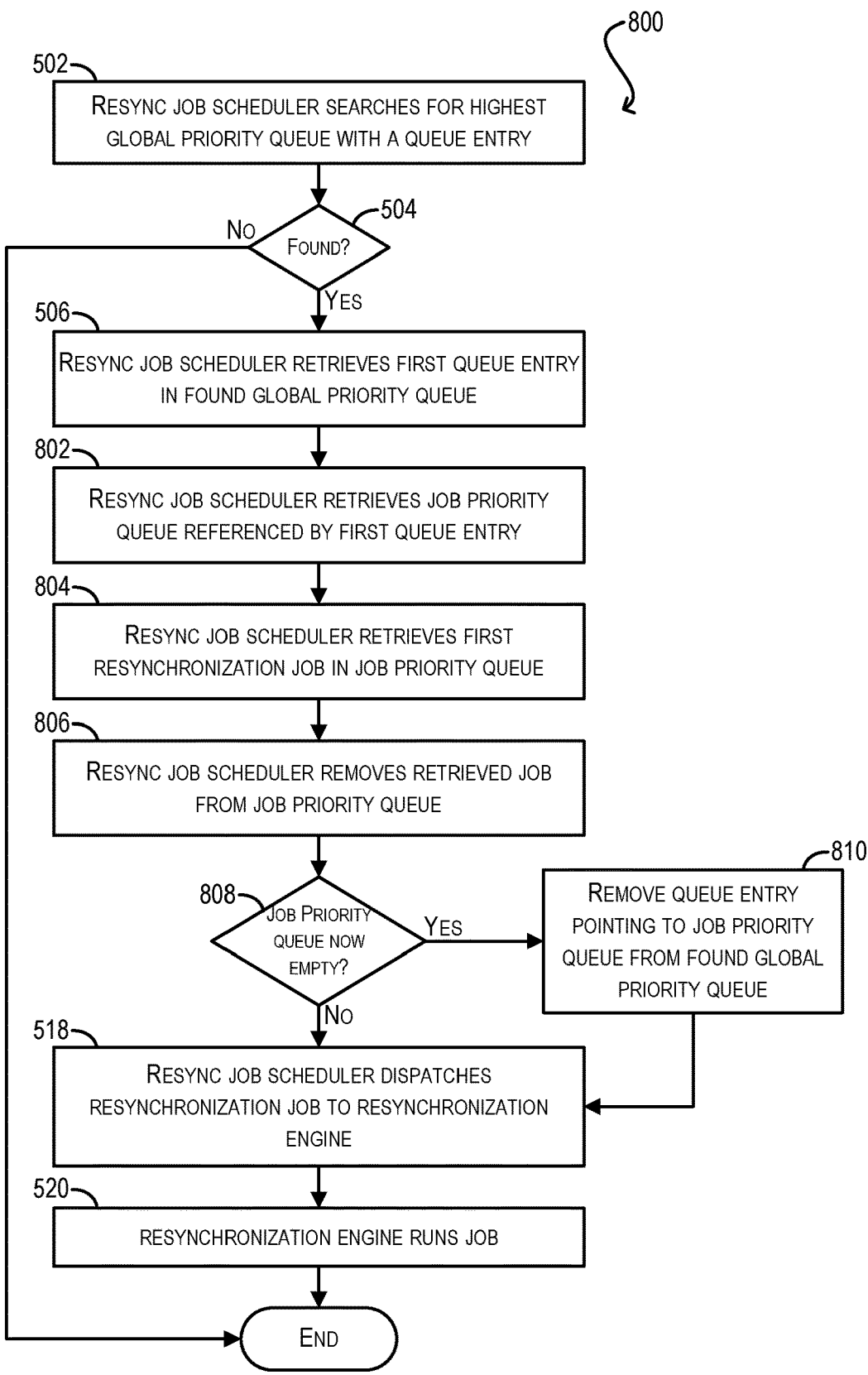
FIG. 8 depicts a modified version of the workflow of FIG. 5 that supports per-job priorities according to an embodiment.

FIG. 8 depicts a workflow 800 that can be performed by resynchronization engine 108/resync job scheduler 110 of a given storage node 102 for dispatching and executing a queued resynchronization job in a manner that supports per-job priorities according to an embodiment. A portion of workflow 800 is identical to workflow 500 of FIG. 5 and thus the overlapping steps are referred to using the same reference numerals. However, at blocks 802-810, resync job scheduler 110 can generally retrieve and de-queue the resynchronization job from the first job priority queue linked to the highest global priority queue. Thus, in these steps, resync job scheduler 110 has essentially been modified to manipulate the job priority queues rather than per-object queues.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for performing intelligent resynchronization job scheduling in a distributed object-based storage system, the method comprising:
    creating, by a storage node of the distributed object-based storage system, a resynchronization job for a component of an object maintained by the distributed object-based storage system, wherein the object is a container of data stored across one or more storage nodes of the distributed object-based storage system, wherein the component is a portion of the data of the object, and wherein the resynchronization job defines one or more input/output (PO) operations to be carried out with respect to the component; and
    if a number of currently running resynchronization jobs on the storage node has reached a threshold:
        determining, by the storage node, a priority level associated with the object;
        adding, by the storage node, the resynchronization job to an object queue for the object; and
        if the added resynchronization job is a first job in the object queue, adding the object queue as a new queue entry to a global priority queue corresponding to the priority level associated with the object.

2. The method of claim 1 further comprising, if the number of currently running resynchronization jobs has not yet reached the threshold:
    immediately executing the resynchronization job; and
    incrementing the number of currently running resynchronization jobs.

3. The method of claim 1 wherein the global priority queue is one of a plurality of global priority queues, each global priority queue corresponding to a possible object priority level.

4. The method of claim 3 further comprising, at a time the number of currently running resynchronization jobs falls below the threshold:
    searching for a highest global priority queue having at least one queue entry; and
    upon finding the highest global priority queue having at least one queue entry:
        retrieving a first queue entry in the highest global priority queue;
        retrieving a first object queue reference by the first queue entry;
        retrieving a first resynchronization job in the first object queue;
        removing the first resynchronization job from the first object queue; and
        executing the first resynchronization job.

5. The method of claim 4 further comprising:
    if the first object queue is empty after removing the first resynchronization job, removing the first queue entry from the highest global priority queue.

6. The method of claim 1 wherein the object is associated with a fault tolerance requirement indicating that the object should remain accessible in the face of one or more storage node failures.

7. The method of claim 1 wherein the resynchronization job is associated with a job priority level that is different from the priority level for the object.

8. A non-transitory computer readable storage medium having stored thereon program code executable by a storage node of a distributed object-based storage system, the program code embodying a method for implementing intelligent resynchronization job scheduling in the distributed object-based storage system, the method comprising:
    creating a resynchronization job for a component of an object maintained by the distributed object-based storage system, wherein the object is a container of data stored across one or more storage nodes of the distributed object-based storage system, wherein the component is a portion of the data of the object, and wherein the resynchronization job defines one or more input/output (I/O) operations to be carried out with respect to the component; and
    if a number of currently running resynchronization jobs on the storage node has reached a threshold:
        determining a priority level associated with the object;
        adding the resynchronization job to an object queue for the object; and
        if the added resynchronization job is a first job in the object queue, adding the object queue as a new queue entry to a global priority queue corresponding to the priority level associated with the object.

9. The non-transitory computer readable storage medium of claim 8 wherein if the number of currently running resynchronization jobs has not yet reached the threshold, the method further comprises:
    immediately executing the resynchronization job; and
    incrementing the number of currently running resynchronization jobs.

10. The non-transitory computer readable storage medium of claim 8 wherein the global priority queue is one of a plurality of global priority queues, each global priority queue corresponding to a possible object priority level.

11. The non-transitory computer readable storage medium of claim 10 wherein the method further comprises, at a time the number of currently running resynchronization jobs falls below the threshold:

searching for a highest global priority queue having at least one queue entry; and upon finding the highest global priority queue having at least one queue entry:

retrieving a first queue entry in the highest global priority queue;

retrieving a first object queue reference by the first queue entry;

retrieving a first resynchronization job in the first object queue;

removing the first resynchronization job from the first object queue; and executing the first resynchronization job.

12. The non-transitory computer readable storage medium of claim 11 wherein the method further comprises:

if the first object queue is empty after removing the first resynchronization job, removing the first queue entry from the highest global priority queue.

13. The non-transitory computer readable storage medium of claim 8 wherein the object is associated with a fault tolerance requirement indicating that the object should remain accessible in the face of one or more storage node failures.

14. The non-transitory computer readable storage medium of claim 8 wherein the resynchronization job is associated with a job priority level that is different from the priority level for the object.

15. A storage node of a distributed object-based storage system, the storage node comprising:

a processor; and a non-transitory computer readable medium having stored thereon program code that, when executed, causes the processor to:

create a resynchronization job for a component of an object maintained by the distributed object-based storage system, wherein the object is a container of data stored across one or more storage nodes of the distributed object-based storage system, wherein the component is a portion of the data of the object, and wherein the resynchronization job defines one or more input/output (I/O) operations to be carried out with respect to the component; and if a number of currently running resynchronization jobs on the storage node has reached a threshold:

determine a priority level associated with the object;

add the resynchronization job to an object queue for the object; and if the added resynchronization job is a first job in the object queue, add the object queue as a new queue entry to a global priority queue corresponding to the priority level associated with the object.

16. The storage node of claim 15 wherein if the number of currently running resynchronization jobs has not yet reached the threshold, the program code further causes the processor to:

immediately execute the resynchronization job; and increment the number of currently running resynchronization jobs.

17. The storage node of claim 15 wherein the global priority queue is one of a plurality of global priority queues, each global priority queue corresponding to a possible object priority level.

18. The storage node of claim 17 wherein the program code further causes the processor to, at a time the number of currently running resynchronization jobs falls below the threshold:

search for a highest global priority queue having at least one queue entry; and upon finding the highest global priority queue having at least one queue entry:

retrieve a first queue entry in the highest global priority queue;

retrieve a first object queue reference by the first queue entry;

retrieve a first resynchronization job in the first object queue;

remove the first resynchronization job from the first object queue; and execute the first resynchronization job.

19. The storage node of claim 18 wherein the program code further causes the processor to:

if the first object queue is empty after removing the first resynchronization job, remove the first queue entry from the highest global priority queue.

20. The storage node of claim 15 wherein the object is associated with a fault tolerance requirement indicating that the object should remain accessible in the face of one or more storage node failures.

21. The storage node of claim 15 wherein the resynchronization job is associated with a job priority level that is different from the priority level for the object.

* * * * *